United States Patent
Manoharan et al.

(10) Patent No.: US 11,781,773 B2
(45) Date of Patent: Oct. 10, 2023

(54) METHOD AND SYSTEM FOR MAXIMIZING SPACE UTILIZATION IN A BUILDING

(71) Applicant: Tata Consultancy Services Limited, Mumbai (IN)

(72) Inventors: Praveen Manoharan, Chennai (IN); Srinarayana Nagarathinam, Chennai (IN); Arunchandar Vasan, Chennai (IN); Venkata Ramakrishna Padullaparthi, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 472 days.

(21) Appl. No.: 17/195,699

(22) Filed: Mar. 9, 2021

(65) Prior Publication Data

US 2022/0154958 A1    May 19, 2022

(30) Foreign Application Priority Data

Nov. 13, 2020   (IN) .............................. 202021049784

(51) Int. Cl.
  *F24F 11/63* (2018.01)
  *F24F 11/46* (2018.01)
  (Continued)

(52) U.S. Cl.
  CPC .............. *F24F 11/63* (2018.01); *F24F 11/46* (2018.01); *F24F 2120/12* (2018.01); *F24F 2140/50* (2018.01); *F24F 2140/60* (2018.01)

(58) Field of Classification Search
  CPC ........ F24F 11/63; F24F 11/46; F24F 2120/12; F24F 2140/50; F24F 2140/60; F24F 2110/65; F24F 2120/10; Y02B 30/70; G06Q 10/06375; G06Q 50/06; G06Q 10/0635

See application file for complete search history.

(56) References Cited

U.S. PATENT DOCUMENTS 8,577,711 B2    11/2013   Korecki et al.
2019/0215177 A1   7/2019   Donlan et al.
(Continued)

*Primary Examiner* — Charles R Kasenge
(74) *Attorney, Agent, or Firm* — Finnegan, Henderson, Farabow, Garrett & Dunner LLP

(57) ABSTRACT

This disclosure relates generally to method and system for maximizing space utilization in a building. Due to current pandemic scenario many organizations eventually need to plan for the return of employees to office space ensuring biosafety. The challenge of maximizing the office space utilization ensuring occupants biosafety and comfort thereby minimizing HVAC energy consumption is necessary. The method utilizes two heuristic approaches for determining maximum allowable occupants placement in the open plan space using an optimal occupant placement technique. This minimizes the HVAC energy if the actual count is lesser than the possible maximum occupants can be placed which further optimizes energy using a joint actuator control technique. Additionally, the proposed two heuristic approaches improve space utilization for the infection rate ensuring bio safety. Full utilization of open plan space is possible when the community infection rate and exposure duration are relatively low resulting low risk probability for uninfected occupants.

12 Claims, 10 Drawing Sheets

(51) Int. Cl.
  *F24F 140/60* (2018.01)
  *F24F 140/50* (2018.01)
  *F24F 120/12* (2018.01)

(56) References Cited

U.S. PATENT DOCUMENTS

2020/0319610 A1    10/2020  Ray et al.
2020/0348038 A1*  11/2020  Risbeck .................. F24F 11/70
2021/0011443 A1*   1/2021  McNamara .......... F24F 11/0001

\* cited by examiner

FIG. 4C

METHOD AND SYSTEM FOR MAXIMIZING SPACE UTILIZATION IN A BUILDING

PRIORITY CLAIM

This U.S. Patent application claims priority under 35 U.S.C § 119 to Indian patent application no. (202021049784), filed on Nov. 13, 2020. The entire contents of the aforementioned application are incorporated herein by reference

TECHNICAL FIELD

The disclosure herein generally relates to the field of building management system, and, more particularly, to method and system for maximizing space utilization in a building.

BACKGROUND

Building utilization is extremely valuable in organizations for efficient space and resource allocation without unnecessary expenditure on excess workspace, energy, operation, and maintenance. Pandemic scenario has caused a dramatic reduction in the use of office buildings. However, organizations eventually need to plan for the return of employees to office spaces from post pandemic scenarios by ensuring their bio-safety. Healthier office spaces are important to their employees. In a recent study of workplaces, 87% of employees rated healthier office spaces as very important. While offices have traditionally served as key venues for social interaction and inclusion in the organization, this perception has changed dramatically, almost overnight, due to COVID-19 induced social distancing. Symptomatic employees can be screened out from buildings while asymptomatic employees can be handled mainly through social distancing. Organizations have embraced working-from-home in a significant way. Employees too currently report preferring to work from home even more than earlier Organizations too potentially benefit from reduced real-estate cost and talent hiring with fewer location constraints.

The current trend of reduced office space utilization is however unlikely to be permanent because humans prefer in-person social interaction and are likely to do so in the future. Due to Pandemic scenarios most of the office-occupancy rebounds, organizations remains closed facing challenge in operating office buildings at least until and possibly even beyond the time a vaccine is available for the pandemic. Specifically, ensuring occupant bio-safety in office buildings will be a sine qua non for organizations from ethical, legal, and economic perspectives.

Current organizational challenges in the pandemic scenarios focus on minimizing infections due to subjects interacting at their offices. While frequent personal and environmental disinfection and indoor use of mask helps major approach to achieve bio-safety is social distancing between the office occupants. So the organization limits maximum occupancy in the building ensuring at least the minimum social distancing or better. Using standard rules of thumb naïvely without understanding a building's specific configuration may be sub-optimal from the perspectives of efficient utilization of the space; and worse, bio-safety.

Many conventional approaches focus on joint optimization of building energy and occupant comfort. These include model-driven optimal HVAC (heating, ventilating and air conditioning) controller and energy optimization with varying occupant thermal comfort preferences. It is summarized with few of existing approaches. Most of these focus on controller of HVAC while some include planning components in placing users for comfort as well.

In another existing approach of the Optimal HVAC controller, significant energy savings were shown over typical rule-based controller strategies. Calibrated models developed from first principles were used. Centralized controller of multiple actuators in a shared space was shown to improve over distributed controller. In another approach for varying thermal comfort preferences is to minimize the overall thermal discomfort. In the self-tuned HVAC controller aims to minimize occupant thermal discomfort. A study on the impact of temperature sensor resolution on various HVAC controller strategies along with personal comfort preferences, placing users with different temperature preferences along the natural temperature field in the shared space was shown to decrease the overall thermal discomfort. In another approach comfort fairness metric evaluates the loss in the comfort of occupants in shared spaces. A user-participatory approach to intelligently adjust the set-point to reduce user comfort conflicts.

Further, viral transmission in buildings has received less attention where for indoor viral propagation has mainly focus on modelling viral droplet behavior in a room. Variation in droplet size with time was studied. The emission rate (or shedding rate) from infected persons for air-borne viral infection was quantified. The effect of HVAC controller filtration products such as MERV 7-11 on control air-borne disease transmission for indoor workspace was considered. Transmission rates of airborne infection in a dental clinic was modelled.

SUMMARY

Embodiments of the present disclosure present technological improvements as solutions to one or more of the above-mentioned technical problems recognized by the inventors in conventional systems. For example, in one embodiment, a system for maximizing space utilization in a building is provided. The system includes dynamically receiving, using a thermodynamics model, a plurality of thermal signals using plurality of sensors positioned in the building. The open plan space of the building is segmented into equally spaced cells comprising a plurality of infected cells and a plurality of uninfected cells. Further, using an optimal occupancy placement technique, maximum allowable occupants in the plurality of uninfected cells is determined based on (i) a plurality of parameters comprising an infection probability, an exposure, and a total number of segmented cells of the open plan space, (ii) a temperature and a humidity obtained from the plurality of thermal signals (iii) an estimated amount of viral particles concentration shed by a plurality of infected subjects at one or more of equally spaced cells in the preoccupied open plan space of the building, and (iv) a susceptible probability of an uninfected subject infected at predefined exposure time, and (v) a one or more neighboring cells adjoining the infected cells. Furthermore, using a joint actuator control technique, energy consumed by an HVAC (heating, ventilation and air conditioning) controller for the building is estimated based on the determined maximum allowable occupants, wherein the HVAC controller comprises a plurality of actuators in the open plan space of the building based on (i) the HVAC controller energy computed using a chiller energy and an actuator supply fan energy, (ii) a predefined temperature range, (iii) a cooling load of each actuator computed using a mass flow rate of the corresponding actuators, an enthalpy of actuator supply, and return air, and (iv) maximum average cell temperature range.

In another aspect, a method for maximizing space utilization in a building is provided. The method includes dynamically receiving, using a thermodynamics model, a plurality of thermal signals using a plurality of sensors positioned in the building. The open plan space of the building is segmented into equally spaced cells comprising a plurality of infected cells and a plurality of uninfected cells. Further, using an optimal occupancy placement technique, maximum allowable occupants in the plurality of uninfected cells is determined based on (i) a plurality of parameters comprising an infection probability, an exposure, and a total number of segmented cells of the open plan space, (ii) a temperature and a humidity obtained from the plurality of thermal signals (iii) an estimated amount of viral particles concentration shed by a plurality of infected subjects at one or more of equally spaced cells in the preoccupied open plan space of the building, and (iv) a susceptible probability of an uninfected subject infected at predefined exposure time, and (v) a one or more neighboring cells adjoining the infected cells. Furthermore, using a joint actuator control technique, energy consumed by an HVAC (heating, ventilation and air conditioning) controller for the building is estimated based on the determined maximum allowable occupants, wherein the HVAC controller comprises a plurality of actuators in the open plan space of the building based on (i) the HVAC controller energy computed using a chiller energy and an actuator supply fan energy, (ii) a predefined temperature range, (iii) a cooling load of each actuator computed using a mass flow rate of the corresponding actuators, an enthalpy of actuator supply, and return air, and (iv) maximum average cell temperature range.

In yet another aspect, provides one or more non-transitory machine readable information storage mediums comprising one or more instructions, which when executed by one or more hardware processors perform actions includes dynamically receiving, using a thermodynamics model, a plurality of thermal signals using a plurality of sensors positioned in the building. The open plan space of the building is segmented into equally spaced cells comprising a plurality of infected cells and a plurality of uninfected cells. Further, using an optimal occupancy placement technique, maximum allowable occupants in the plurality of uninfected cells is determined based on (i) a plurality of parameters comprising an infection probability, an exposure, and a total number of segmented cells of the open plan space, (ii) a temperature and a humidity obtained from the plurality of thermal signals (iii) an estimated amount of viral particles concentration shed by a plurality of infected subjects at one or more of equally spaced cells in the preoccupied open plan space of the building, and (iv) a susceptible probability of an uninfected subject infected at predefined exposure time, and (v) a one or more neighboring cells adjoining the infected cells. Furthermore, using a joint actuator control technique, energy consumed by an HVAC (heating, ventilation and air conditioning) controller for the building is estimated based on the determined maximum allowable occupants, wherein the HVAC controller comprises a plurality of actuators in the open plan space of the building based on (i) the HVAC controller energy computed using a chiller energy and an actuator supply fan energy, (ii) a predefined temperature range, (iii) a cooling load of each actuator computed using a mass flow rate of the corresponding actuators, an enthalpy of actuator supply, and return air, and (iv) maximum average cell temperature range.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4C illustrates a contour of number of susceptible cells in the vicinity of an infected cell in the open plan space of the building, in accordance with some embodiments of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 1:
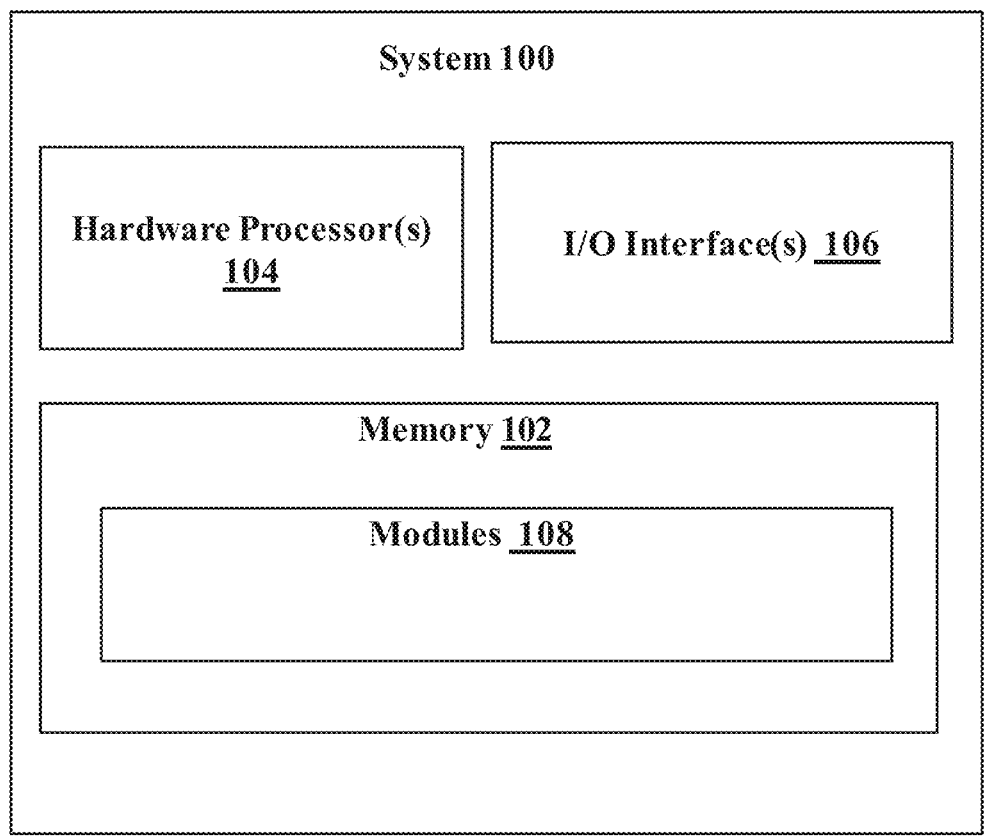
FIG. 1 illustrates an exemplary block diagram of a system (alternatively referred as occupancy placement system 100) for maximizing space utilization in a building, in accordance with some embodiments of the present disclosure.
Figure 2:
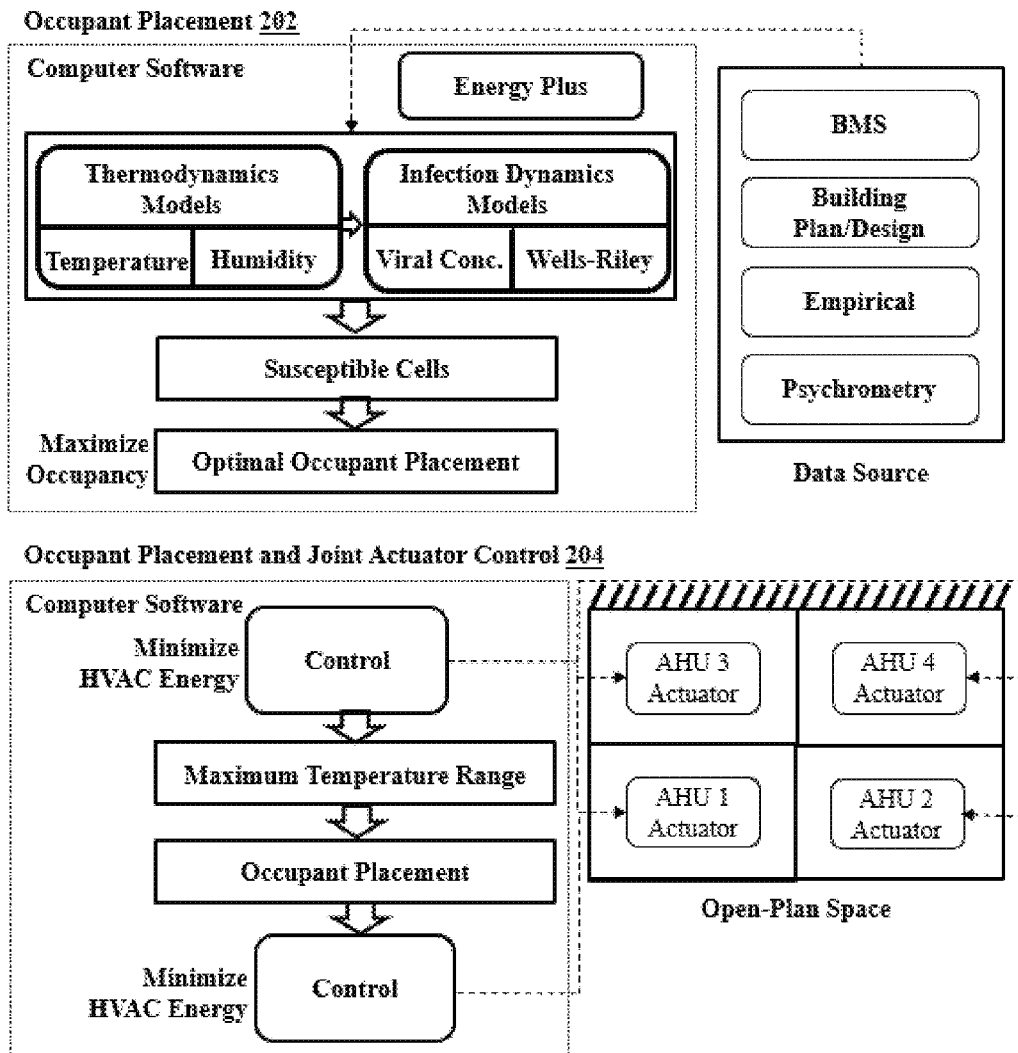
FIG. 2 illustrates a high-level architectural overview of the occupancy placement system 100, in accordance with some embodiments of the present disclosure.
Figure 3:
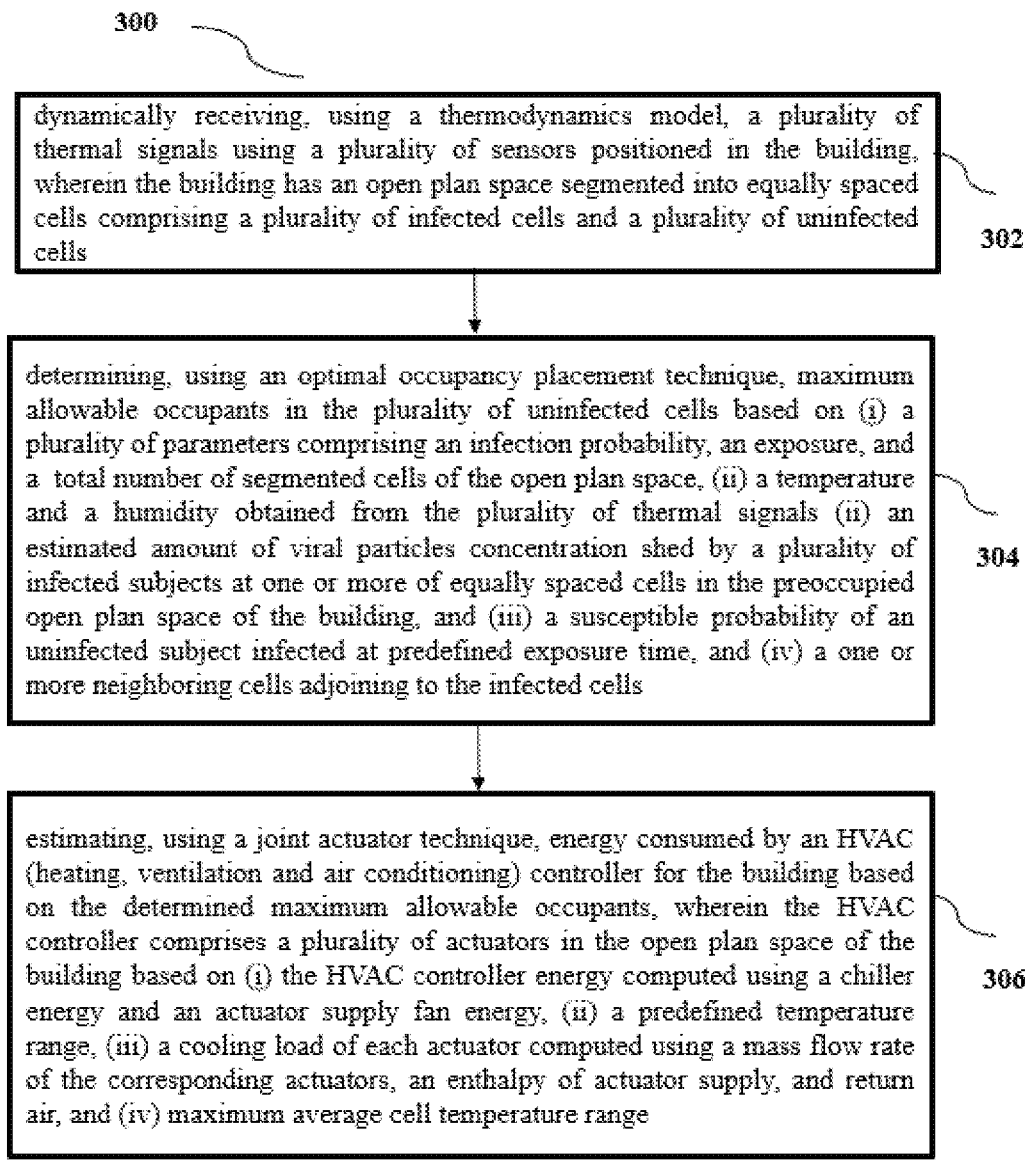
FIG. 3 is a flow diagram illustrating the method (300) for occupancy maximizing space utilization in a building, in accordance with some embodiments of the present disclosure.

Embodiments herein provides a method and system for maximizing space utilization in a building. The method disclosed, enables maximizing joint optimization of building energy and occupant comfort. Effective space utilization and adhering to social distancing norms are intrinsically competing objectives for the organizations. For informed decision making, understanding the infection transmission in an open-plan indoor office space associated with the building and its effect on susceptible occupants is important. The proposed disclosure is utilizing two heuristics comprising an optimal occupancy placement technique for maximum allowable space utilization, and joint actuator control technique for minimizing energy consumption. The system includes thermodynamics model and a viral propagation model for determining virus concentration for maximum space utilization. The viral community infection rate includes occupants exposure duration, and virus emission rate as parameters. The placing of occupants in the infected cells from the open plan space resulted in a low-risk probability for the uninfected occupants. The challenge of maximizing space utilization subject to meeting the occupant thermal comfort keeping the risk of new infection to low value, has not received much attention. The method of the proposed disclosure provides an optimal occupancy placement technique which increases maximum allowable space utilization. Further, the joint controller multiple actuators available in the open-plan space are necessary to meet thermal and bio-safety constraints. When the space utilization required is less than the maximum allowable space, energy optimization is the secondary objective in the proposed disclosure based on HVAC (heating, ventilation and air conditioning) controller with significant energy savings. The HVAC controller and user placement for minimizing viral transmission is necessity in buildings for maximizing occupancy placement and for minimizing energy consumption. The disclosed system is further explained with the method as described in conjunction with FIG. 1 to FIG. 6C below.

Referring now to the drawings, and more particularly to FIG. 1 through FIG. 6C, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as occupancy placement system 100) for maximizing space utilization in a building, in accordance with some embodiments of the present disclosure.

In an embodiment, the occupancy placement system 100 includes processor (s) 104, communication interface (s), alternatively referred as occupancy placement system or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontroller, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The modules 108 can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s).

FIG. 2 illustrates a high-level architectural overview of the occupancy placement system 100, in accordance with some embodiments of the present disclosure. The FIG. 2 includes a plurality of components comprising an occupant placement modeler and a joint actuator controller. The occupant placement modeler comprises a thermodynamics model, an infection dynamics model and a data source. The data source obtains inputs from various components associated with the building which consumes energy. The thermodynamics model provides spatio-temporal dynamics of thermal and bio safety properties of the building. Further, thermal signals are calibrated from the open plan space of the building derived from the first principles. The infection dynamics model provides viral concentration for varying community infection rates, occupancy exposure duration and virus emission rates. The proposed disclosure performs better than regular placements that ensure minimum separation between neighbors. The maximum allowable occupancy in the open-plan space of the building having thermal bio safety constraints is characterized by occupant thermal comfort and lower probability of new infections, respectively which is the primary objective of the present disclosure. If the actual occupancy required is lesser than the optimal maximum allowable occupancy, the secondary objective is to minimize the HVAC controller energy consumption after obtaining the thermal and bio-safety considerations.

FIG. 3 is a flow diagram illustrating the method (300) for maximizing space utilization in a building using the occupancy placement system 100, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 dynamically receiving, using a thermodynamics model, a plurality of thermal signals using sensors positioned in a building, wherein an open plan space of the building is segmented into equally spaced cells comprising a plurality of infected cells and a plurality of uninfected cells. Considering an example where the organization objective is to minimize infection rate due to subjects interacting or returning to office from post pandemic scenarios. In general, infection spread rate is a function of three major factors comprising (i) the base community infection rate representing probability that a randomly chosen individual is infected symptomatically, (ii) the extent of transmission of the airborne viral emissions due to air circulation in a specific building which largely is a function of the solar insolation and actuator controller, and (iii) the exposure duration of the occupants.

The thermodynamics model estimates the spatio temporal dynamics of thermal and bio safety properties of the open plan space associated with the building. This model calibrates the plurality of thermal signals from the open plan space derived from the first principles. The open plan space of the building is segmented into equally spaced cells for maximizing optimal occupant placement as referred in FIG. 4A. Each cell is utilized for determining temperature and humidity from the plurality of thermal signals.

Referring now to the steps of the method 300, at step 304, the one or more hardware processors 104 determining, using an optimal occupancy placement technique, to place maximum allowable occupants in the plurality of uninfected cells based on (i) a plurality of parameters, (ii) a temperature and a humidity obtained from the plurality of thermal signals (iii) an estimated amount of viral particles concentration shed by a plurality of infected subjects at one or more of equally spaced cells in the preoccupied open plan space of the building, and (iv) an susceptible probability of an uninfected subject infected at predefined exposure time, and (v) a one or more neighboring cells adjoining the infected cells. Here, considering the above example for determining maximum allowable occupancy in the building, the plurality of thermal signals is utilized to obtain the temperature and the humidity.

The example of the open plan space specifications in the real-world of size 20,000 sqft (1860 m2) shown in the figure. Four identical HVAC controller actuators serve this space with a design occupancy of $\Phi_D$=200 at 100 square feet per person. Thus the minimum separation distance is 10 ft between the adjacent cells. Each actuator can deliver 11,000 CFM of cold air with a design tonnage of 20 TR. It is to be noted that placements may not always be as regular as shown in figure. However, the chosen uniform placements for ease of presentation, while noting that the proposed method does not require this. The normal occupancy duration is between 0900 h to 1800 h, while the HVAC controller starts at 0800 h to pre-cool the space.

In one embodiment, the optimal occupancy placement technique determines maximum allowable occupants to be placed in the uninfected cells in the open plan space of the building. This technique performs the steps of the following, obtaining a plurality of parameters comprising an infection probability, an exposure, and a total number of segmented cells of the open plan space. The two main objective of the infection dynamics module is to estimate the viral particles concentration shed by the infected persons at various points in the occupied open plan space of the building. Further, the infection probability is estimated from the uninfected person based on the exposure for a given viral load concentration and the exposure time. The occupancy placement performs the steps as specified below in Table 1,

TABLE 1

Algorithm for Optimal occupancy placement technique
Algorithm 1: Occupant placement

| Inputs: | |
|---|---|
| 1 Y | // Community probability of infection |
| 2 r | // Duration of exposure |
| 3 $\Phi_D$ | // Number of cells representing design occupancy |
| 4 $\Theta \leftarrow (1:\Phi_D)$ | // Initialize allowable cells |
| 5 for each cell i = 1 to $\Phi_D$ do | |
| 6  \| $I_{cell=i}$ = 1 and $I_{cell\neq i}$ = 0 | |
| 7  \| for t = 0 to r do | |
| 8  \| \| Get $T^t$, $W^t$, $C^t$ for all cells using Equations 1-3 | |
| 9  \| end for | |
| 10 \| Get P at all cells using Equation 4 | |
| 11 $\|x_i \leftarrow \left\{\text{Cells with P} > \left(\frac{\alpha}{\gamma^{\Phi_D}}\right)\right\}$ | |
| 12 end for | |
| 13 $c \leftarrow \text{argmin}_i \|x_i\|$ | // Place first occupant at cell c |
| 14 A $\leftarrow$ {c} | // that affects minimum neighbours |
| 15 $\Theta \leftarrow \Theta - \chi_c$ | // Allowable cells after 1st placement |
| 16 while $\Theta$ not empty do | |
| 17 \| $d_{min} \leftarrow \infty$ | // $\infty$ represents a large number |
| 18 \| for each cell l in $\Theta$ do | |
| 19 \| \| d $\leftarrow$ AverageEuclideanDistance(l, A) // Average of | |
| \| \| distance between l and every element in A | |
| 20 \| \| if d < $d_{min}$ then | |
| 21 \| \| \| $d_{min} \leftarrow$ d | |
| 22 \| \| \| c $\leftarrow$ l | |
| 23 \| \| end if | |
| 24 \| end for | |
| 25 \| A $\leftarrow$ A $\cup$ {c} | // Place the next occupant at cell c |
| 26 \| $\Theta \leftarrow \Theta - \chi_c$ | // Remove affected neighbours of c |
| 27 end while | |
| 28 A* $\leftarrow$ A | //Optional placement locations |
| 29 $\Phi^* \leftarrow$ \|A*\| | // Maximum allowable occupants |

Further, the thermal capacitance of air is computed to determine the plurality of thermal parameters in the open plan space of the building based on (i) an internal heat gain from the occupants, (ii) a convective heat gain from walls and windows of the building, (iii) an air mixing flowrate of temperature between adjoining cells, (iv) an infiltration rate of outside temperature and heat capacity, and (v) an actuator heat removal rate as described below in equation 1 and Table 1 and Table 2 for the notations used in the equation 1, $$C_i \frac{dT_i}{dt} = \dot{Q}_{i,int} + \Sigma_{w \in W_i} U_w S_w (T_\infty - T_i) +$$
$$\Sigma_{k \in N_i} \dot{m}_{ik} C_p (T_k - T_i) + \dot{m}_\infty C_p (\hat{T}_\infty - T_i) + \dot{m}_i C_p (T_{sa} - T_i)$$

equation 1

Figure 4A:
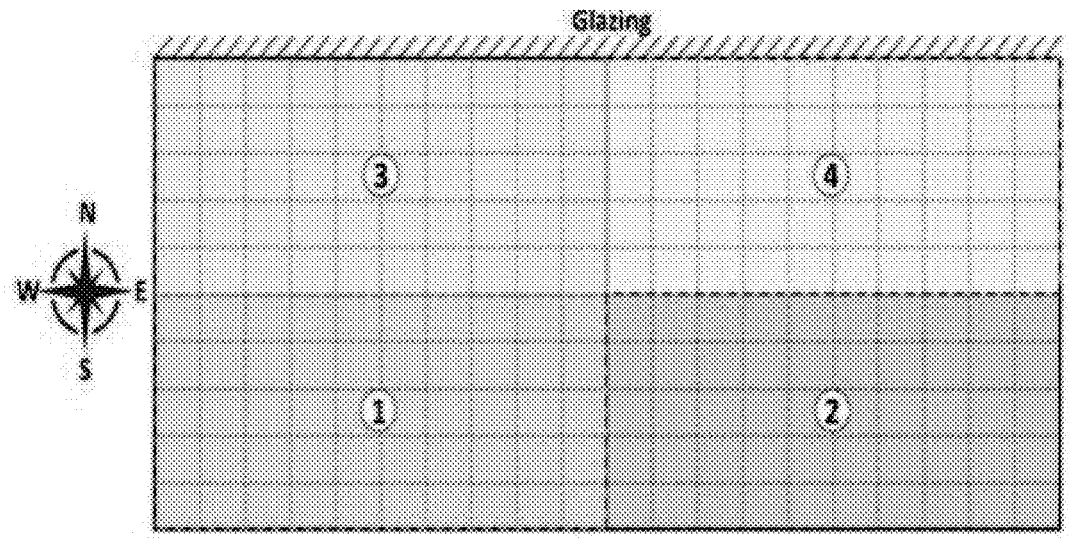
FIGS. 4A & 4B illustrates a schematic representation of interior location of a segmented cell associated with the open plan space of the building for placing maximum allowable occupants in the uninfected cells using the occupancy placement system 100, in accordance with some embodiments of the present disclosure.
Figure 4B:
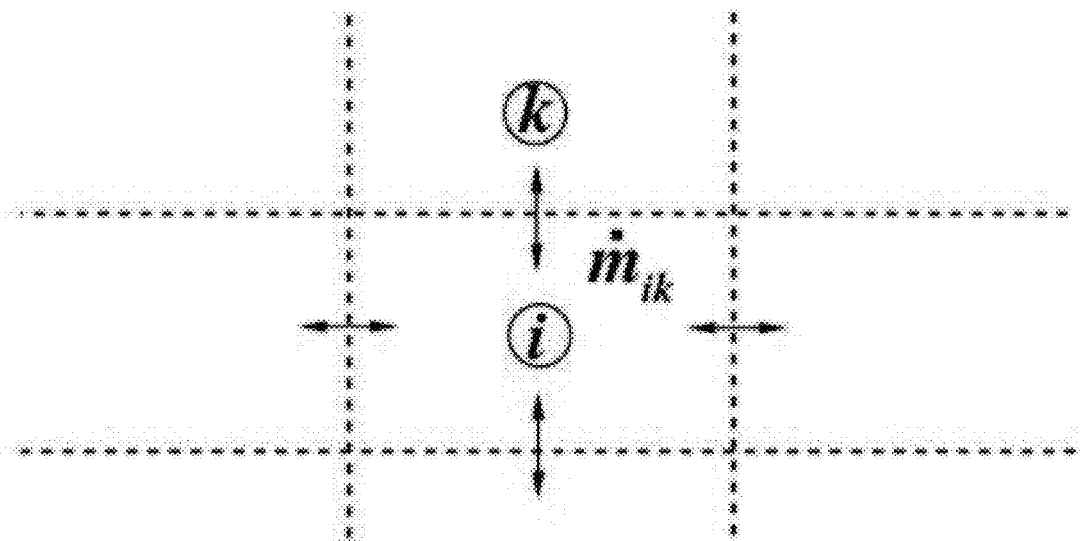

Where,
$\dot{Q}_i$—internal heat gain
$\Sigma_{w \in W_i} U_w S_w (T_\infty - T_i)$—convective heat gain from walls/windows
$\Sigma_{k \in N_i} \dot{m}_{ik} C_p (T_k - T_i)$—mixing from adjoining locations
$\dot{m}_\infty C_p (T_\infty - T_i)$—infiltration rate
$\dot{m}_i C_p (T_{sa} - T_i)$—actuator heat removal rate In equation 1, the internal heat gains are obtained from the occupants, lighting, and electrical load in the open plan space of the building. The outside ambient adds heat load through the convective heat transfer from the walls or windows and from the infiltration rate. The ambient adds heat directly to the locations adjoining the building envelope with lower impact on the interior location of the open plan space. The main challenge is the modelling of air-mixing between the neighboring locations, as shown in FIG. 4A and FIG. 4B.

TABLE 2

Notations used in Thermodynamics model

| Symbol | Meaning |
| --- | --- |
| t | Time-index |
| τ | Exposure duration |
| Δt | Simulation time-step |
| i | Location index |
| $T_i$, $W_i$, $C_i$ | Temperature, humidity, and virus concentration at i |
| $T_\infty$, $W_\infty$, $C_\infty$ | Outside temperature, humidity, and concentration |
| $T_{sa}$, $W_{sa}$, $C_{sa}$ | Supply air temperature, humidity, and concentration |
| $T_{SP}$, $T_{SB}$ | Comfort set-point and set-back temperatures |
| $N_i$ | Set of all neighbours of i |
| $W_i$ | Set of all walls/windows of i |
| $\dot{Q}_{i,int}$ | Internal heat generation at i |
| $U_w$ | Thermal conductance of wall/window |
| $S_w$ | Surface area of wall/window |
| $C_i$ | Thermal capacitance of air |
| $C_p$ | Specific heat capacity |
| $\rho_i$ | Air density |
| $V_i$ | Volume of space at i |
| $\dot{m}_{ik}$ | Air-mixing flowrate between locations i and k |
| $\dot{m}_\infty$ | Outside air infiltration flowrate |
| $\dot{m}_i$ | Supply flowrate at i |
| $\dot{m}_{i, moist}$ | Moisture generation rate at i |
| $\dot{m}_{actuator}$ | Mass flowrate of actuator |
| $Q_{cc}$ | Cooling load of actuator |
| $h_{sa}$, $h_{ra}$ | Enthalpy of actuator supply and return air |
| $E_{HVAC}$ | Total HVAC energy |
| $E_{ch}$ | Chiller energy |
| $E_{actuator}$ | actuator supply fan energy |

Further, an air density volume of the open plan space is computed based on (i) a moisture generation rate, (ii) an air mixing flowrate of humidity between adjoining cells, (iii) an infiltration rate of outside humidity, and (iv) an actuator moisture removal rate. Referring now again to FIG. 2, and the above described example the air density volume of the open plan space is computed using the equation 2, $$\rho_i V_i \frac{dW_i}{dt} = \dot{m}_{i,moist} + \Sigma_{k \in N_1} \dot{m}_{ik}(W_k - W_i) + \dot{m}_\infty (W_\infty - W_i) + \dot{m}_i (W_{sa} - W_i) \quad \text{equation 2}$$

Where,
$\dot{m}_{moist}$—moisture generation rate
$\Sigma_{k \in N_1} \dot{m}_{ik}(W_k - W_i)$—mixing from adjoining locations
$\dot{m}_\infty (W_\infty - W_i)$—infiltration rate
$\dot{m}_i (W_{sa} - W_i)$—actuator moisture removal rate Further, the amount of viral particles concentration is estimated based on (i) a viral shredding rate, (ii) a particle mixing from adjoining cells, (iii) an infiltration rate of outside air, and (iv) an actuator virus removal rate; virus moves due to the air movement, mass transport balance equation to compute the virus concentration at any point in space and time as the virus spread like contaminant gas would spread.

TABLE 3

Notations used in Bio safety infection dynamics model

| Symbol | Meaning |
| --- | --- |
| $p_i$ | Infection probability of susceptible occupant at i |
| $I_i$ | Infected individuals at i |
| $q_{i, shedding}$ | Quanta generation rate at i |
| $b_r$ | Occupant breathing rate |
| $\Phi_D$ | Total available placements in the open-plan space |
| $\Phi$ | Occupant count |
| γ | Community infection rate |
| d | Separation distance between seats |
| α | Threshold of new infection risk |

The virus concentration at the location of cell and at time is defined as the number of unit particles quanta per unit volume. This step is computed based on the below mentioned equation 3, $$\rho_i V_i \frac{dC_i}{dt} = \sum I_i * \rho_i q_{i,shedding} + \Sigma_{k \in N_1} \dot{m}_{ik}(C_k - C_i) + \dot{m}_\infty(C_\infty - C_i) + \dot{m}_i(C_{sa} - C_i) \quad \text{equation 3}$$

Where,
$\Sigma I_i * \rho_i q_{i,shedding}$—virus shedding rate
$\Sigma_{k \in N_1} \dot{m}_{ik}(C_k - C_i)$—particle mixing from adjoining locations
$\dot{m}_\infty(C_\infty - C_i)$—infiltration rate
$\dot{m}_i(C_{sa} - C_i)$—actuator virus particle removal rate The intuition of viral concentration increases due to the number of infected subjects shedding the virus at the given location and the shed virus from neighboring locations which is being brought due to air mixing. Similarly, the viral concentration decreases due to outside air infiltration which mixes with the room air at the actuator which results in removing virus particles. The rate at which concentration changes is the combination of both these factors. An implicit assumption in the model is that the incubation period of the virus is greater than the working hours considered. The shedding rates of few prior available viruses are depicted in Table 4, In recent scenarios quanta generation rate from a COVID-19 asymptomatic subject in a controller led study reported and is given in Table 4. To avoid subjectivity-induced bias in choosing the viral shedding rate for the COVID-19 pandemic as described in Table 5, the proposed disclosure provides optimal results with parametrized shedding rate over reasonable range of values instead of a specific value.

TABLE 4

Quanta generation rates of common airborne diseases

| Type of disease | Shedding rate in quanta/hour |
| --- | --- |
| Influenza (H1N1) | 15 to 500 |
| Rhinovirus | 1 to 10 |
| Tuberculosis | 1 to 50 |
| SARS | 10 to 300 |

TABLE 4-continued

Quanta generation rates of common airborne diseases

| Type of disease | Shedding rate in quanta/hour |
|---|---|
| Measles | 570 to 5600 |
| COVID 19 | 11 to 1000 |

TABLE 5

Quanta generation rates (quanta/h) of COVID -19 from an asymptomatic subject

| Respiratory activity | Subject activity | | |
|---|---|---|---|
| | Seated | Standing | Light exercise |
| Voiced counting | 50 | 75 | 161 |
| Whispering | 12 | 18 | 39 |
| Speaking | 320 | 480 | 1000 |
| Breathing | 11 | 16 | 34 |
| Average rate | 100 | 150 | 320 |

Further, a susceptible probability of an uninfected subject is estimated at the exposure time based on exponential function of breathing rate of an occupant and the viral particles concentration at the exposure. For the obtained viral concentration at each cell location of the open plan space of the building, the susceptible probability for each individual cell is estimated based on the exposure time which gets infected. Using equation 3, the susceptible probability is estimated by deriving equation 4, $$P_i = 1 - e^{-b_r \Sigma_0^\tau C_t \Delta_t} \qquad \text{equation 4}$$

Where, $b_r$ is the breathing rate of each occupant, $\tau$ is the total exposure duration, $\Delta_t$ is the simulation time step.

While the breathing rate depends on the age, gender and activity level of the occupant. The results of the proposed disclosure depict increasing trend for infection as the breathing rate, the exposure duration and the concentration of viral particles increases.

In one embodiment iteratively, maximum allowable occupants to be placed in the segmented cell of the open plan space of the building is determined by, placing, the first occupant at the cell that affects minimum neighbors after placing the first occupant and eliminating the neighboring cells affected by the first occupant. Computing, an average euclidian distance between every consecutive cells in the open plan space and the cells occupied with occupants and placing, the consecutive occupant at the cell which has minimum euclidian distance. Referring again now to the (FIG. 2) the community infection rate and the susceptible occupant exposure time duration are the inputs to determine maximum allowable occupancy placement. The occupants to be placed in the cells are through the assignment matrix A. To ensure social distancing the unassigned buffer cells ($A_i=0$) between any two occupied cells ($A_i=1$) is described below in equation 5, $$\left\{ \begin{array}{c} \max \\ A \end{array} \right. U = \sum_i A_i \qquad \text{equation 5}$$

Subject to equation 1 to equation 3, $$\forall i A_i = 1, p_i(t) \leq \alpha \text{ for } t \in [0,\tau] \qquad \text{equation 6}$$

Further, for the assigned cells constraints requires all cells occupied with the probability of infection due to other occupied cells bounded. The energy considered for the occupancy placement that the temperature of each cell is maintained within the comfort temperature range irrespective of the cell's occupancy. The constraints are obtained using the equation 6, at the end of exposure duration for cells with occupants, where 'a' represents the threshold of new infection risk. The cumulative effect of quanta concentration at every time step is the air mixing mass flowrate which is a function of the cell temperature and humidity based on equation 1 and equation 2.

In another embodiment, the optimal placement technique enables providing heuristic approach for placing the occupants. For the given infected cell, the spatial quanta concentration is estimated using the equation 3. The method iteratively visits each cell in the space ($\Phi_D$). In each iteration, it is assumed that the visited cell 'i' alone has an infected occupant. Then the number of neighboring cells that visited the infected cell affects is calculated at (Line 11) as depicted in Table 1. The neighboring cell is affected by cell i if the probability of infection due to 'i' exceeds a threshold $$\frac{\alpha}{\gamma \Phi_D}.$$

The limiting case is when the community infection rate is so low such that $\gamma \Phi_D \approx 0$. At this $\gamma$, the space can be utilized to its full capacity. The first occupant is placed in the cell that minimizes the number of affected neighbors. Then pruning the set of feasible locations by removing those cells with probability of infection $>\alpha$ (Line 15) (Table 1). Sequentially, the placement process follows for the next occupant which is to be placed in the feasible location that is at the nearest average euclidian distance from the locations already chosen in Lines 18-25 (Table 1). After each placement, the set of feasible locations is pruned by eliminating the locations that are at risk of infection $>\alpha$. It is to be noted that when the cell 'C' is processed, when $\chi_c$ may not be a proper subset of $\Theta$. This is because as the previous cell 'C' whose $\chi_c$' was removed from $\Theta$ might have removed the subset $\chi_c \cap \chi_{c'}$ from $\Theta$ already while processing cell C'. This process is repeated till there are no more feasible locations.

Referring now to the steps of the method 300, at step 306, the one or more hardware processors 104 estimating (306), using an joint actuator control technique, energy consumed by an HVAC controller for the building based on the determined maximum allowable occupants, wherein the HVAC controller comprises a plurality of actuators in the open plan space of the building based on (i) the HVAC controller energy using a chiller energy and an actuator supply fan energy, (ii) a predefined temperature range, and (iii) a cooling load of each actuator computed using a mass flow rate of the corresponding actuator, an enthalpy of actuator supply, and return air, and (iv) a maximum average cell temperature range. The joint actuator control technique performs the steps as specified below in Table 6, for minimizing energy consumed.

TABLE 6

Algorithm for Joint actuator control technique
Algorithm 2: Occupant placement and joint control of actuators

| 1 | maxTempRange ← 0 |
| 2 | for cell i = 1...$\Phi_D$ do |
| 3 |    $I_i = 1$ and $I_{k \neq i} = 0$ |

TABLE 6-continued

Algorithm for Joint actuator control technique
Algorithm 2: Occupant placement and joint control of actuators

```
4     |   for t = 0 to τ do
5     |   |   Solve optimal control problem (Equations 7-8)
6     |   end for
7     |   Get the time-averaged T at all cells
8     |   if Range(T) > maxTempRange then
9     |   |   maxTempRange ← Range(T)
10    |   |   T* ← T
11    |   end if
12    end for
13    Θ ← list of cell locations sorted by T*
14    Φ ← 1
15    A ← Ø
16    while (Φ < Φ*) and (Θ ≠ Ø) do
17    |   A ← A ∪ Θ[1]      // Place occupant at first cell in Θ
18    |   Θ ← delete(Θ, χ₁)  // Remove affected neighbouring cells
      |   from consideration while preserving ordering of Θ
19    |   Φ ← Φ + 1
20    end while
      // Post the occupant placement, the optimal control problem is
      solved again
21    for t = 0 to τ do
22    |   Solve optimal control problem (Equations 7-8)
23    end for
```

In another embodiment, the joint actuator control technique is defined in equation 5 and equation 6 that have discrete A and continuous $T_{SP}$ actuator temperature set-points) decision variables. Further, the non-linear objective functions and constraints constitute integer or mixed integer non-linear programming that are generally considered hard to solve using standard optimization techniques. The proposed disclosure having two heuristics approaches provides the solution to the occupant placement and joint actuator control problem using the model for viral concentration in equation 3 and temperature in equation 1. Further the bound of the probability of the new infection at a pre-determined threshold a even after placing the maximum number of occupants. The maximum expected number of infected people is γ, $\Phi_D$, where $\Phi_D$ is the maximum (design) occupancy and γ is the probability that randomly chosen subject in the community is infected. The feasible uninfected cells pruned from the set-of all those cells where the probability of infection due to that occupant is less than $$\frac{\alpha}{\gamma\Phi_D}.$$

After placing the set of ϕ occupants, the probability of the available subjects placed is newly infected from all other placements is approximated by $$\gamma*\frac{\alpha}{\gamma\Phi_D}*\Phi_D$$

which is lesser than α based on the construction constraints $\phi\leq\Phi_D$.

The joint actuators technique performs the steps of minimizing energy consumed by the HVAC controller in the open plan space of the building for maximizing occupancy placement by computing, the HVAC controller energy for optimization based on actuator controller set points. The HVAC controller energy is computed using the chiller energy and the actuator supply fan energy for every segmented cell of the building. The temperature of averaged cells is determined for all the segmented cells in the open plan space of the building. Here, the space utilization required in the organization policy allows only 25% of the occupancy which is less than maximum allowable occupancy represented as (ϕ<Φ*) considering HVAC controller energy is optimized based on equation 7, $$\min_{A,TSP} E_{HVAC}=(E_{ch}+\Sigma_{j=1}^{m} E_{actuator}^{j}) \qquad \text{equation 7}$$

Further, the temperature of the segmented cells in the open plan space of the building is estimated within the predefined temperature range, which is represented using the equation 8, $$T_{min}\leq T_i^t\leq T_{max} \qquad \text{equation 8}$$

Where, $T_{min}$ and $T_{max}$ are the minimum and maximum cell temperatures, which is further represented below in equation 9 and equation 10, $$T_{min}=T_{SP}-1°\text{ C.} \qquad \text{equation 9}$$

$$T_{max}=T_{SP}+1°\text{ C.} \qquad \text{equation 10}$$

respectively in the occupied cells. In the unoccupied cells, $T_{max}$ is allowed to the higher set back temperature of $T_{SB}+1°$ C. Further, the maximum average temperature range is computed for each cell in the open plan space of the building by, sorting the available uninfected cells in the open plan space and determining the occupant counts. Further, iteratively determining the required occupants to be placed in the viral concentration uninfected cells in the open space of the building by, placing, the first occupant at the cell which has minimum temperature and eliminating the neighboring cells affected by the first occupant. Then sorting, the remaining available cells based on the temperature range to place the consecutive next occupant at the cell which has minimum temperature and recomputing, the HVAC controller energy for optimization based on actuator controller set points.

The joint actuator control technique gives an overview of the approach like in the optimal occupancy placement technique, iterating over cells one at a time to establish the maximum temperature range possible in the open-plan space. It is well-known that maintaining the temperature within acceptable limits in the occupied cells and keeping a higher temperature in unoccupied cells where possible can result in reduced HVAC controller energy consumption. So the joint actuator controller problem is solved in each step to minimize the energy consumption. The resulting temperature field that has the maximum range amongst all possible cell iterations is chosen as the template for assigning occupants to cells (Lines 8-11) (Table 6). Further, sorting the cells in ascending order of the temperature values and placing the occupants sequentially in the ordered list while being constrained by the same probability of infection in cells as before. It is to be noted that the joint actuator control technique is most likely to help when there are fewer occupants than the maximum allowable Φ* is identified using the optimal occupant placement technique, particularly when cells under one or more actuators is left unoccupied. If the required occupancy is such that all the actuators need to run, then there may not be any scope to save HVAC controller energy.

Referring now to FIG. 4B, the illustrates a schematic representation of interior location of a segmented cell associated with the open plan space of the building for placing maximum allowable occupants in the uninfected cells using the occupancy placement. The open plan space of the building allows peak occupancy with one occupant per cell. Here, there are no physical partitions in the space representing approximate boundaries for each cell. There are actuators serving the open plan space. All cells served by each actuator obtains the same amount of cold air from that actuator where the north surface wall of the space is glazed throughput. In one embodiment, the calibrated models for the parameters of interest before testing in the real-world is described. The model development is subject to the availability of sensory data. The physics-based thermal model can be calibrated with the data normally available in the building management system (BMS) using the method proposed. The sensory information for calibrating the infection transmission model is generally not available. Further, there may be challenges for implementation in the real-world such as obtaining HVAC controller actuator's controller logic (which is usually proprietary).

The model parameters utilize a combination of real-world data and empirical models to calibrate the thermal model. Table 7 summarizes the source of thermal model parameters. If the room does not have a widespread deployment of sensors, calibrating a thermal model to match the readings of the temperature and humidity sensors available at the actuator's supply and return air ducts.

TABLE 7

Model parameters source

| | Parameters | Data source |
|---|---|---|
| Internal heat gain | Occupancy | BMS |
| | Lighting load | BMS |
| | Electrical load | Design |
| $U_w$ | U-value of wall/window material | Design |
| $S_w$ | Surface area of wall/window | Building plan |
| $T_\infty$, $W_\infty$ | Outside temperature and humidity | BMS |
| $\dot{m}_k$ | Air mixing flow rate | Empirical |
| $\rho_i$, $C_p$ | Air density and specific heat capacity | Psychometry |
| $\dot{m}_\infty$ | Infiltration flowrate | Empirical |
| $\dot{m}_t$ | Cool air supply flowrate | BMS |
| $\dot{m}_t$,moist | Occupant moisture generation | Empirical |
| $T_{sa}$, $W_{sa}$ | Actuator supply air temperature and humidity | BMS |

Further, the flowrate of cool air is not directly measured, but is estimated using the actuator's operating frequency data in Hz. Threshold of new infection risk and community infection rates, the probability of an uninfected occupant contracting the virus over the exposure duration must be kept to a low value and is taken as $\alpha=0.1$ (in Equation 6). The community infection rates are evaluated for $\gamma=0.5\%$, 1%, 1.5%, 2%, 2.5%, and 3%. Since the open plan space is designed for $\phi D=200$, the expected number of new infections at peak occupancy is non-zero and ranges from 1-6.

The baseline for the occupant placement problem is compared with standard regular pattern placements in the open-plan space that have minimum separation distance between the occupants as 10-50 feet. It is compared with the optimal occupant placement technique that minimizes HVAC controller energy with random occupant placements in locations thereby maximizing the space utilization (A* from the optimal occupant placement technique).

In another embodiment, the evaluated baselines with all placement locations is not computationally feasible. Hence, depending on $\gamma$, considering the number of random placement of infected occupants in the available locations which impacts the uninfected occupants and HVAC controller energy. The performance metrics uses the following two metrics: (1) the total number of newly infected occupants at the end of the exposure duration, and (2) the HVAC controller energy savings during the occupied business hours $E_{HVAC}^{savings}$. In all the experimental results, the simulation time-step is $\Delta t=1$ min, chosen to capture the rate of infection dynamics. The comfort set-point and the set-back temperatures in the occupied cells and the unoccupied cells are taken as $T_{SP}=24°$ C. and $T_{SB}=27°$ C., respectively, following ASHRAE Standard. Further, the actuators are designed to take a maximum of 40% outside air in the supply air at rated conditions. It is chosen to keep outside air fixed at 40% in all the experimental analysis. The outside air is assumed to be fresh, meaning the quanta concentration is taken as 0.

Figure 4C:
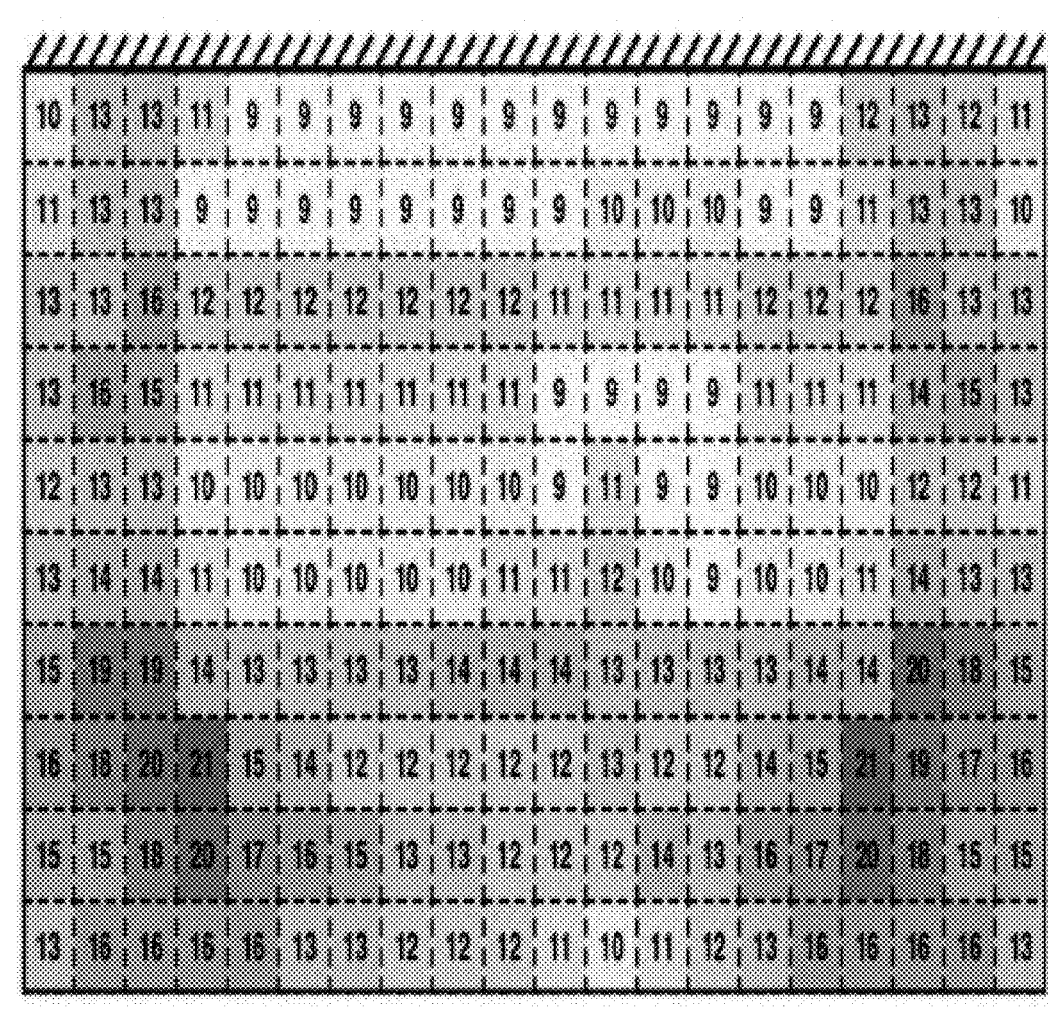

FIG. 4C illustrates a contour of number of susceptible cells in the vicinity of an infected cell in the open plan space of the building, in accordance with some embodiments of the present disclosure. The figure shows the result of iteratively visiting every cell and placing the infected subject in that cell alone. The numeric value in each cell indicates the number of susceptible neighboring cells with the probability of infection risk p>0.1. This reflects Line 11 (Table 1) in the optimal occupant placement technique in action. It is observed the following, 1. All cells are not equally bio-safe: In general, different cells affect varying number of neighbors as shown in the figure. Here, even when the geometry is symmetric between two cells still not be equally bio-safe. It is to be noted that the heat loads due to solar radiation penetrating the space from glazing and the wall conductive/convective heat load due to the direction of sun path/angle vary with time. 2. Solar insolation can help due to higher-order effects also, it is also observed that many cells that affect the minimum number of neighbors are located mostly near the north façade of the room. This can be explained using a higher-order effect. Because the north façade is glazed, the cells near the façade experience higher heat load due to direct solar radiation penetration through glazing. Consequently, actuator 3 and actuator 4 that serve these cells experience a higher heat-load than the remaining actuator 1 and actuator 2 to maintain the same temperature set-point. This in turn results in a higher supply air flow rate for actuators 3 and 4 and so higher (fresh) outside air. Even cells served by the same actuator with identical cold air mass-flow may differ in resulting temperatures due to the varying heat-loads of the cells. Cells near the glazing are likely to maintain higher temperatures than interior cells resulting in higher mixing flowrates to interior cells. It is also noted transport more viral particles from the source cell to uninfected cells. However, the combined effects of increased flow in actuator 3 and actuator 4, and increased mixing from the warmer cells near the glazing to interior cells helps in diluting the quanta concentration in the source cells closer to the north façade, and thus affect lesser neighbors compared with other cells, particularly in the regions served by actuator 1 and actuator 2.

Figure 5A:
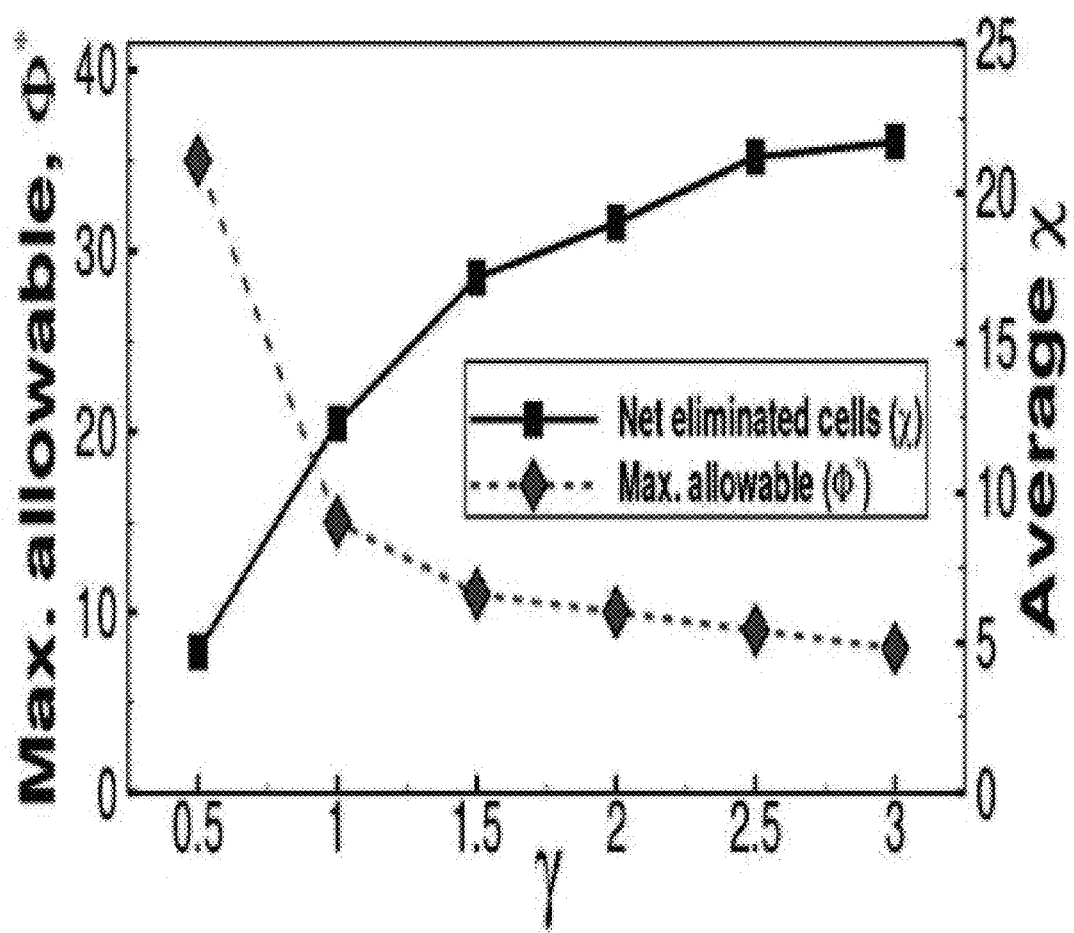
FIG. 5A illustrates a graphical representation of community of infection rates for maximum allowable occupancy, in accordance with some embodiments of the present disclosure.

FIG. 5A illustrates a graphical representation of community of infection rates for maximum allowable occupancy, in accordance with some embodiments of the present disclosure. The model parameters, the quanta shedding rate is the most uncertain for a pathogen like COVID-19. To avoid subjective the maximum allowable occupants parametrized by the quanta emission rate and the exposure duration. Specifically, virus emission rates of 50, 100, and 200 quanta/h and the exposure durations of 2, 4, and 9 h, as shown in Table 8. It is observed that the following, as expected the number of allowable occupants decreases with an increase in the virus emission rate, the community infection rate, and the exposure duration. In addition to the limiting occupancy, another controller knob is to ensure bio-safety which limits exposure duration. For instance, for γ=0.5%, even full occupancy is permissible for emission rate up to 100 quanta/h when exposure is limited to 2 h.

TABLE 8 maximum allowable occupancy (Φ*) parametrized on quanta emission rate and exposure duration

| Virus emission rate (quanta/h) | Community infection rate (γ) | | | | | |
|---|---|---|---|---|---|---|
| | 0.5% | 1% | 1.5% | 2% | 2.5% | 3% |
| Exposure duration τ = 2 h | | | | | | |
| 50 | 200 | 200 | 180 | 159 | 115 | 89 |
| 100 | 200 | 159 | 91 | 64 | 53 | 38 |
| 200 | 162 | 65 | 40 | 27 | 23 | 20 |
| Exposure duration τ = 4 h | | | | | | |
| 50 | 195 | 126 | 66 | 51 | 35 | 29 |
| 100 | 132 | 53 | 29 | 21 | 17 | 15 |
| 200 | 53 | 21 | 15 | 11 | 10 | 9 |
| Exposure duration τ = 9 h | | | | | | |
| 50 | 82 | 34 | 21 | 15 | 13 | 11 |
| 100 | 35 | 15 | 11 | 10 | 9 | 8 |
| 200 | 15 | 10 | 8 | 7 | 7 | 6 |

If the emission rate is high (200 quanta/h) space can hardly be utilized without risking bio-safety even a low γ = 0.5%. This suggests that it is better to not operate the facility in such a case.

Figure 5B:
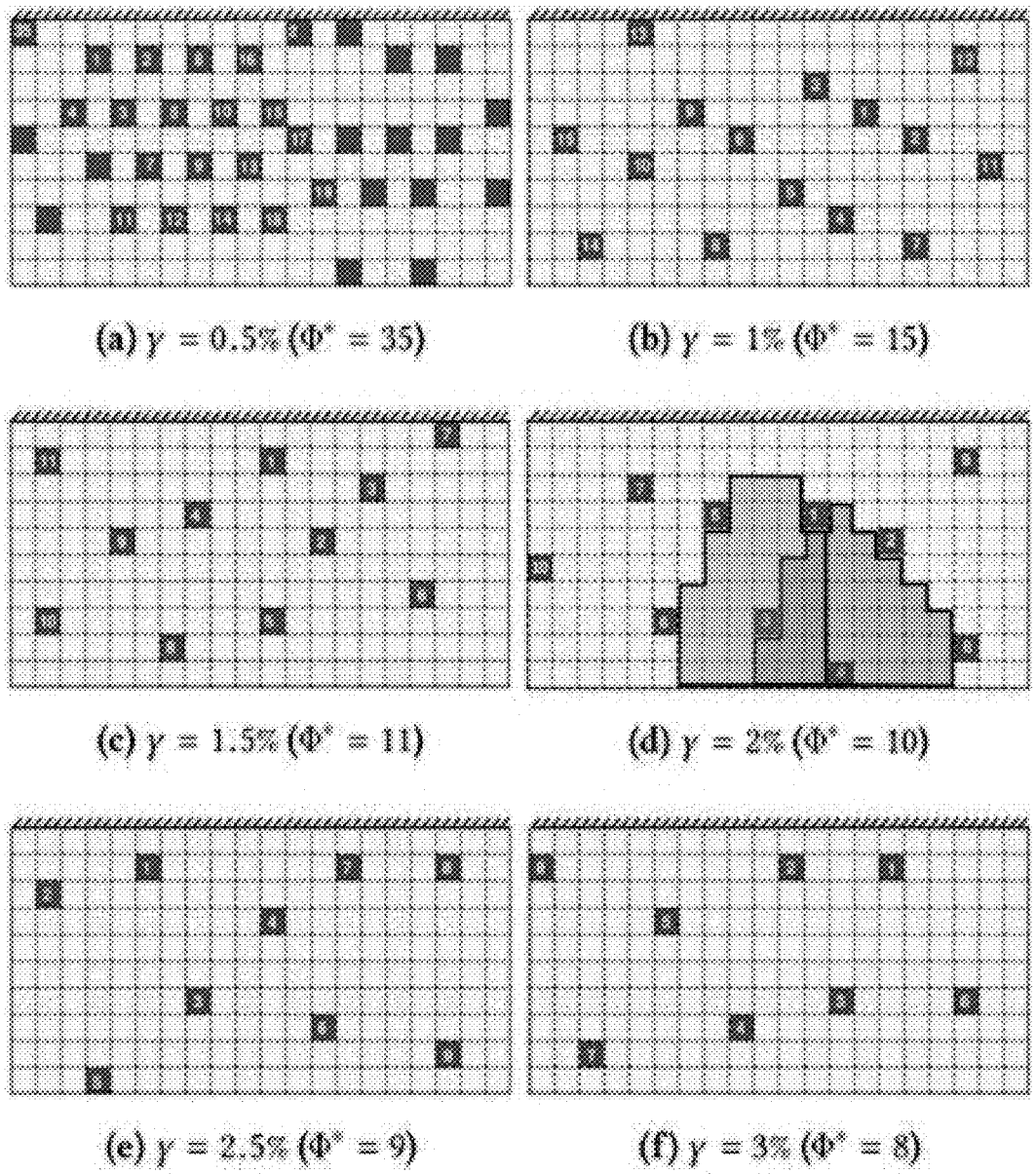
FIG. 5B illustrates a graphical representation of various community infection rates for maximum allowable occupancy positions and intersecting sets of eliminated neighbors using the system 100, in accordance with some embodiments of the present disclosure.

FIG. 5B illustrates a graphical representation of various community infection rates intersecting sets of eliminated neighbors for maximum allowable occupancy using the system 100, in accordance with some embodiments of the present disclosure. The placement strategy is evaluated for community infection rate γ ranging from 0.5% to 3%. Figure shows the optimal placements (A*), and thus the maximum allowable occupants (ϕ*) for an exposure rate of 9 h (typical office business hours) and an average quanta emission rate of 100 quanta/h per infected occupant. The maximum allowable occupancy: The figure shows (on the primary Y-axis) the maximum occupancy ϕ* allowed by the optimal placement technique as a function of γ represented using dotted lines (FIG. 66). ϕ* decreases rapidly with increasing γ initially and then slowly. To explain the trend, we consider the number of neighboring cells eliminated |χc| for each placement c for varying values of γ. The secondary Y-axis in FIG. 4 shows |χc| averaged across c. The solid black line curve (FIG. 6B) shows the net number of neighboring cells eliminated for placing at cell c, when considering cells that have already eliminated due to previous placements c'. With increasing γ, the average |χ| increases and then saturates; this explains the behavior in ϕ*. The figure shows the locations for the allowable occupancy (A*) for varying γ. It is observed that the chosen locations of occupants vary with γ. Even the location of the first occupant is not the same. Because varying γ in combination with the temperature-air-mixing field of the room results in varying quanta concentrations, varying cells are eliminated resulting in varying locations for placements. It shows an example of neighboring cells eliminated during the 3rd and 4th placements (regions shaded in lighter and darker, respectively FIG. 66). Note that the sets χ3 and χ4 have a few common cells (χ3∩χ4) in the overlap region. Comparison with baseline: The baseline approach places subjects regularly in the grid with a separation of d, as shown in the figure for d=20 ft and 40 ft. For minimum separation of d and a floor area of Sf, the baseline approach would allow for an occupancy ϕB of roughly O(Sf/d2). Among these, randomly chosen infected people independently with probability γ. Then, the expected new infection rate (NIR) over a Monte-Carlo simulation of the infected subjects. The NIR is defined as the ratio of the people newly infected at the end of the simulation to the occupancy ϕB.

Figure 6A:
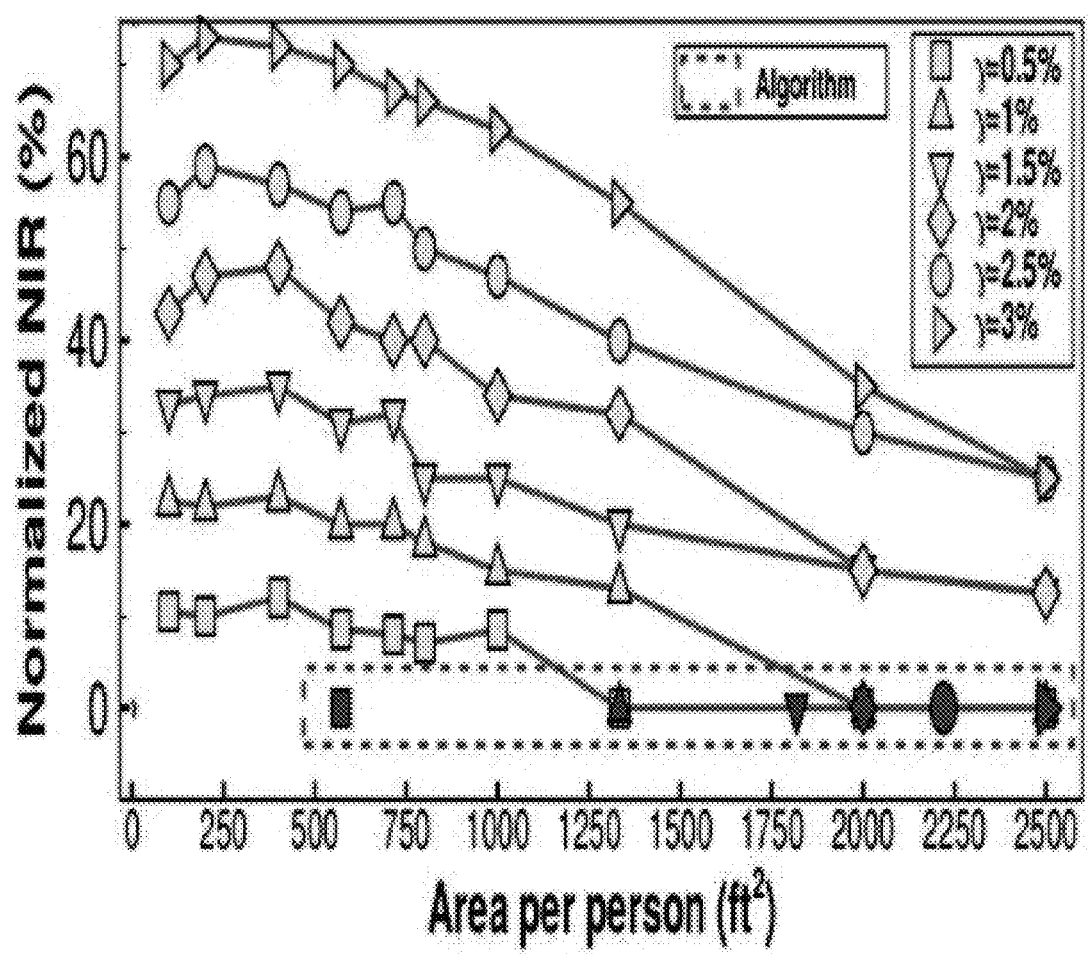
FIG. 6A illustrates a graphical representation of normalized new infection rate (NIR) within the area per subject for maximum allowable occupancy to be placed in the open plan space of the building using the optimal occupancy placement technique, in accordance with some embodiments of the present disclosure.

FIG. 6A illustrates a graphical representation for maximum allowable occupancy to be placed in the open plan space of the building using the optimal occupancy placement technique, in accordance with some embodiments of the present disclosure. The figure shows comparison between the baseline regular placement strategy and our approach. Specifically, the baseline is evaluated at various separation distance d; and infection rate γ. The X-axis shows the area consumed per person occupying the space for varying distances of separation. The Y-axis shows the NIR for varying distances of separation. Each curve in the figure represents a specific value of γ. For the regular placement, the NIR decreases with separation, and increases with γ as expected. The symbols marked with darker color within box (FIG. 6B) with dashed lines shows the solutions identified by the optimal occupancy placement for various γ. The NIR is close to zero for our approach due to our thresholding approach to eliminate neighbors while modelling all thermal and biological constraints. The approach is conservative in trading off space for higher bio-safety. The existing guidelines may not suffice to ensure bio-safety. Though regular placement can achieve the same NIR at very high distance of separation, we note that correctly identifying this conservative separation distance would also require the same modelling effort.

Figure 6B:
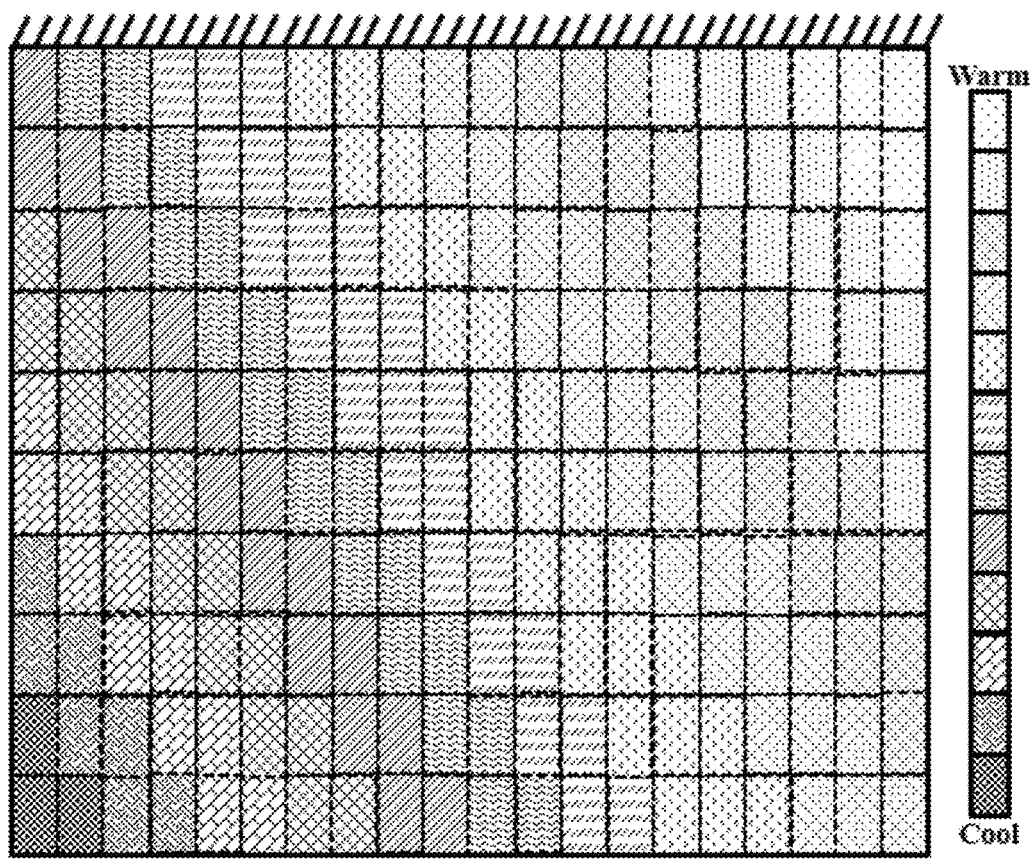
FIG. 6B illustrates a graphical representation for maximum temperature range for maximum allowable occupancy to be placed in the open plan space of the building using the optimal occupancy placement technique, in accordance with some embodiments of the present disclosure.

FIG. 6B illustrates a graphical representation for maximum temperature range for maximum allowable occupancy to be placed in the open plan space of the building using the optimal occupancy placement technique, in accordance with some embodiments of the present disclosure. The joint actuator control technique aims to save HVAC controller energy by limiting the actuator usage to the extent possible while maintaining the constraints of bio-safety. It is obtained the time-averaged temperature field that has the maximum maintainable range, as shown in the figure. This maximum temperature range configuration is obtained by visiting each cell iteratively and maintaining that cell alone in the comfort temperature range while minimizing the energy by solving the optimization problem equation 7 and equation 8. The optimal controller ensures the temperature in the cell under consideration is acceptable for comfort, while other cells are at a higher temperature, where possible, to save energy. The joint actuator control technique will sort cells in the ascending order of the temperature and place occupants in cells while respecting the low infection risk constraint.

Figure 6C:
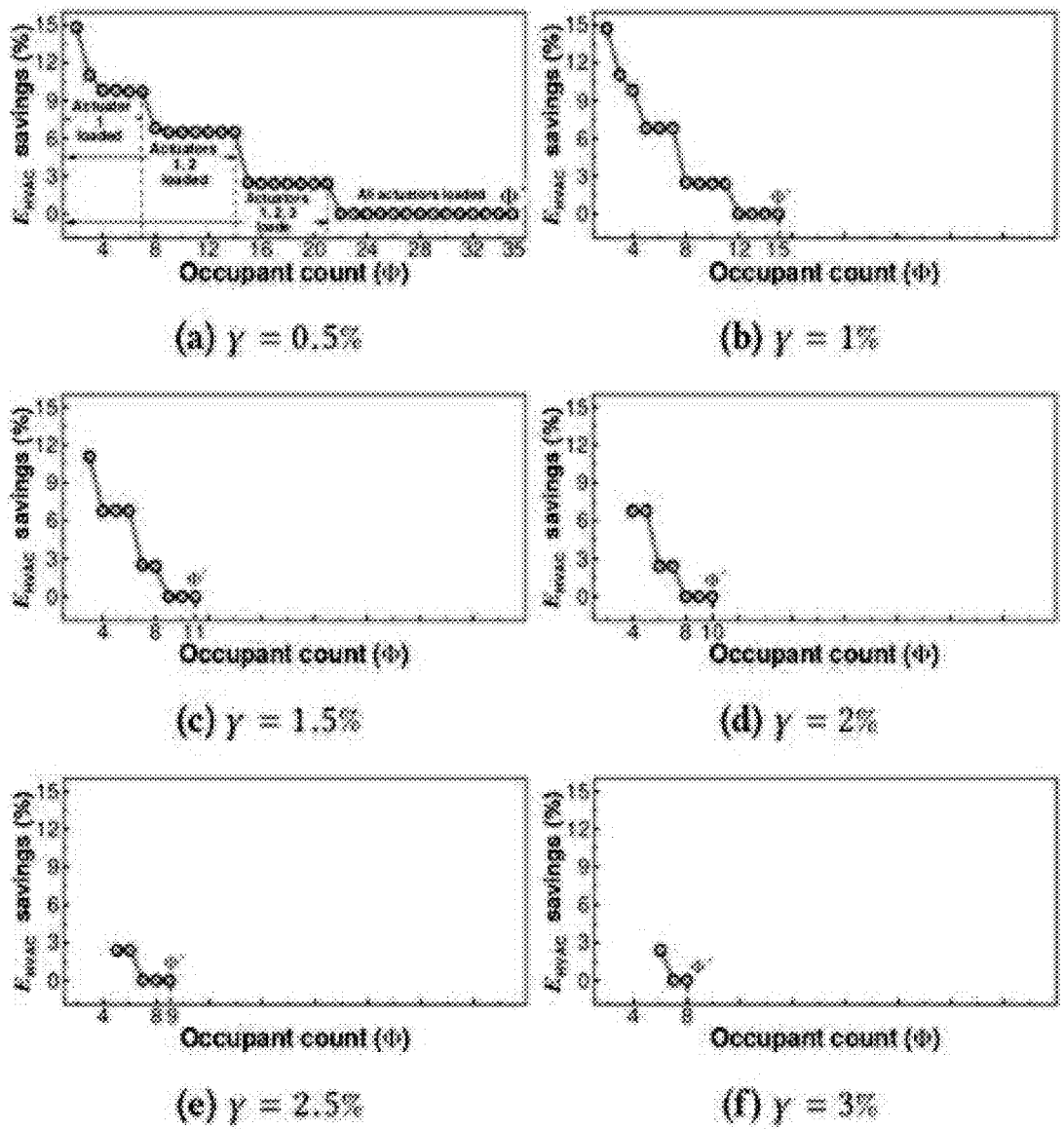
FIG. 6C illustrates a graphical representation of HVAC controller energy savings with increasing number of occupants for different infection community rates using the system 100, in accordance with some embodiments of the present disclosure.

FIG. 6C illustrates a graphical representation of HVAC controller energy savings with increasing number of occupants for different infection community rates using the system 100, in accordance with some embodiments of the present disclosure. The HVAC controller energy savings achieved using the optimal occupancy placement technique for different community infection rates with an exposure duration of 9 h at 100 quanta/h virus emission rate. As more cells become occupied, more actuators will work harder to keep the temperature within acceptable bounds. Thus, the HVAC controller energy would increase. The X-axis in the figure represents the number of occupants and the Y-axis gives the HVAC controller energy savings (%). To get a maximum savings of approximately 15% when the community infection rate is γ=0.5%. As the number of required occupants increases, cells under other actuators get occupied progressively, resulting in a decrease in energy savings. The occupancy threshold beyond which no savings are possible varies with γ. For instance, when the required occupancy is greater than 21 at γ=0.5%, all actuators are loaded similarly with no HVAC controller savings. Even at γ=3%, although the placements are farther away from one another, a saving of up to 3% is possible. The energy savings has a step trend. Each step indicates one additional actuator's region getting occupied. Within an actuator's region the scope for saving energy is very minimal, as observed in the figure where the savings remain nearly constant over some range of φ. Hence, in an actuator's region, more occupants can be packed for nearly the same HVAC controller energy consumption provided the bio-safety constraints allow it. The energy savings possible with all the identified cells under one, two, and three actuators required to be maintained within the comfort temperature threshold are approximately 10%, 6%, and 3% respectively.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of building management system. The embodiment thus provides method and system for maximizing space utilization in a building. Moreover, the embodiments herein further provide maximum allowable occupancy decreases with increases in the community infection rate. The rate of decrease in the occupancy is non-linear in the community infection rate, with lower decreased with higher infection rate. The problem of maximizing the allowable occupants in an open-plan space is subject to meeting the occupants' thermal comfort and bio-safety constraints. It is also experimented and evaluated the scope to minimize the HVAC controller energy particularly when the open-plan space is served by multiple actuators and the required occupancy is less than the maximum allowable. The proposed disclosure provides two heuristics approaches to solve the problems that obey the physics-based thermal and virus concentration models. The community infection rate, occupants exposure duration, and virus emission rates are utilized as parameters for experimental analysis. The placing occupants results in low-risk probability for uninfected occupants. Further, full utilization of the space is possible only when the community infection rate and exposure duration are relatively low. For the average occupancy placement scenario, it is experimented that the space utilization is only 17.5%. The method also shown that when the required occupancy is less than the maximum allowable, occupant placement together with joint controller of multiple actuators resulted in savings of up to 15%.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method (300) for maximizing space utilization in a building, the method comprising:
   dynamically receiving (302), via a one or more hardware processors, using a thermodynamics model, a plurality of thermal signals using a plurality of sensors positioned in the building, wherein the building comprises an open plan space segmented into equally spaced cells comprising a plurality of infected cells and a plurality of uninfected cells;

determining (304), via the one or more hardware processors, using an optimal occupancy placement technique, maximum allowable occupants in the plurality of uninfected cells based on (i) a plurality of parameters comprising an infection probability, an exposure, and a total number of segmented cells of the open plan space, (ii) a temperature and a humidity obtained from the plurality of thermal signals (iii) an estimated amount of viral particles concentration shed by a plurality of infected subjects at one or more of equally spaced cells in the open plan space of the building, and (iv) a susceptible probability of an uninfected subject infected at predefined exposure time, and (v) a one or more neighboring cells adjoining the infected cells; and estimating (306), via the one or more hardware processors, using a joint actuator control technique, energy consumed by an HVAC (heating, ventilation and air conditioning) controller for the building based on the determined maximum allowable occupants, wherein the HVAC controller comprises a plurality of actuators in the open plan space of the building based on (i) the HVAC controller energy computed using a chiller energy and an actuator supply fan energy, (ii) a predefined temperature range, (iii) a cooling load of each actuator computed using a mass flow rate of the corresponding actuators, an enthalpy of actuator supply, and return air, and (iv) maximum average cell temperature range.

2. The method (300) as claimed in claim 1, wherein determining maximum allowable occupants to be placed in the uninfected cells in the open plan space of the building using the optimal occupancy placement technique comprises:

obtain, the plurality of parameters comprising an infection probability, an exposure, and a total number of segmented cells of the open plan space;

compute, a thermal capacitance of air to determine the plurality of thermal parameters based on (i) an internal heat gain from the occupants, (ii) a convective heat gain from walls and windows of the building, (iii) an air mixing flowrate of temperature between adjoining cells, (iv) an infiltration rate of outside temperature and heat capacity, and (v) an actuator heat removal rate;

compute, air density volume of the open plan space based on (i) a moisture generation rate, (ii) an air mixing flowrate of humidity between adjoining cells, (iii) an infiltration rate of outside humidity, and (iv) an actuator moisture removal rate;

estimate, the amount of viral particles concentration based on (i) a viral shredding rate, (ii) a particle mixing from adjoining cells, (iii) an infiltration rate of outside air, and (iv) an actuator virus removal rate;

estimate, a susceptible probability of an uninfected subject infected at the predefined exposure time based on exponential function of breathing rate of an occupant and the viral particles concentration; and iteratively performing, to determine the maximum allowable occupants to be placed in the segmented cell of the open plan space of the building by, (a) placing, a first occupant at the cell that affects minimum neighboring cells and eliminate the neighboring cells affected by the first occupant;

(b) computing, an average euclidian distance between every consecutive cells in the open plan space and the cells occupied with the plurality of uninfected occupants; and (c) placing, a consecutive occupant at the cell which has minimum euclidian distance.

3. The method (300) as claimed in claim 1, wherein minimizing energy consumed by an HVAC controller in the open plan space of the building for maximizing occupancy placement using the joint actuator control technique comprises:

computing, the HVAC controller optimized energy based on a actuator controller set points, the chiller energy and the actuator supply fan energy for every segmented cell;

determining, the temperature of averaged cells for all the segmented cells in the open plan space of the building;

determine, if the temperature of the segmented cells in the open plan space of the building is within the predefined temperature range;

compute, the maximum average temperature range for each cell in the open plan space;

sort, the available uninfected cells in the open plan space to determine the occupant counts;

iteratively, determine the required occupants to be placed in the viral concentration uninfected cells in the open space of the building by, i. placing, the first occupant at the cell which has minimum temperature and eliminate the neighboring cells viral concentration infected by the first occupant;

ii. sorting, the remaining available cells based on the temperature range to place the consecutive next occupant at the cell which has minimum temperature; and iii. recomputing, the HVAC controller for optimized energy based on the actuator controller set points.

4. The method (300) as claimed in claim 1, wherein the maximum occupancy placement is improved based on the minimized HVAC controller energy consumed in each cell of the building.

5. A system (100) for maximizing occupancy placement in a building, comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

dynamically receiving, using a thermodynamics model, a plurality of thermal signals using a plurality of sensors positioned in the building, wherein the building comprises an open plan space segmented into equally spaced cells comprising a plurality of infected cells and a plurality of uninfected cells;

determining, using an optimal occupancy placement technique, maximum allowable occupants in the plurality of uninfected cells based on (i) a plurality of parameters comprising an infection probability, an exposure, and a total number of segmented cells of the open plan space, (ii) a temperature and a humidity obtained from the plurality of thermal signals (iii) an estimated amount of viral particles concentration shed by a plurality of infected subjects at one or more of equally spaced cells in the open plan space of the building, and (iv) a susceptible probability of an uninfected subject infected at predefined exposure time, and (v) a one or more neighboring cells adjoining the infected cells; and estimating, using a joint actuator control technique, energy consumed by an HVAC (heating, ventilation and air conditioning) controller for the building based on the determined maximum allowable occupants, wherein the HVAC controller comprises a plurality of actuators in the open plan space of the building based on (i) the HVAC controller energy computed using a chiller energy and an actuator supply fan energy, (ii) a predefined temperature range, (iii) a cooling load of each actuator computed using a mass flow rate of the corresponding actuators, an enthalpy of actuator supply, and return air, and (iv) maximum average cell temperature range.

6. The system (100) as claimed in claim 5, wherein determining maximum allowable occupants to be placed in the uninfected cells in the open plan space of the building using the optimal occupancy placement technique comprises:

obtain, the plurality of parameters comprising an infection probability, an exposure, and a total number of segmented cells of the open plan space;

compute, a thermal capacitance of air to determine the plurality of thermal parameters based on (i) an internal heat gain from the occupants, (ii) a convective heat gain from walls and windows of the building, (iii) an air mixing flowrate of temperature between adjoining cells, (iv) an infiltration rate of outside temperature and heat capacity, and (v) an actuator heat removal rate;

compute, air density volume of the open plan space based on (i) a moisture generation rate, (ii) an air mixing flowrate of humidity between adjoining cells, (iii) an infiltration rate of outside humidity, and (iv) an actuator moisture removal rate;

estimate, the amount of viral particles concentration based on (i) a viral shredding rate, (ii) a particle mixing from adjoining cells, (iii) an infiltration rate of outside air, and (iv) an actuator virus removal rate;

estimate, a susceptible probability of an uninfected subject infected at the predefined exposure time based on exponential function of breathing rate of an occupant and the viral particles concentration; and iteratively performing, to determine the maximum allowable occupants to be placed in the segmented cell of the open plan space of the building by,
i. placing, a first occupant at the cell that affects minimum neighboring cells and eliminate the neighboring cells affected by the first occupant;
ii. computing, an average euclidian distance between every consecutive cells in the open plan space and the cells occupied with the plurality of uninfected occupants; and
iii. placing, a consecutive occupant at the cell which has minimum euclidian distance.

7. The system (100) as claimed in claim 5, wherein minimizing energy consumed by an HVAC controller in the open plan space of the building for maximizing occupancy placement using the joint actuator control technique comprises:

computing, the HVAC controller optimized energy based on a actuator controller set points, the chiller energy and the actuator supply fan energy for every segmented cell;

determining, the temperature of averaged cells for all the segmented cells in the open plan space of the building;

determine, if the temperature of the segmented cells in the open plan space of the building is within the predefined temperature range;

compute, the maximum average temperature range for each cell in the open plan space;

sort, the available uninfected cells in the open plan space to determine the occupant counts;

iteratively, determine the required occupants to be placed in the viral concentration uninfected cells in the open space of the building by,
i. placing, the first occupant at the cell which has minimum temperature and eliminate the neighboring cells viral concentration infected by the first occupant;
ii. sorting, the remaining available cells based on the temperature range to place the consecutive next occupant at the cell which has minimum temperature; and
iii. recomputing, the HVAC controller for optimized energy based on the actuator controller set points.

8. The system (100) as claimed in claim 5, wherein the maximum occupancy placement is improved based on the minimized HVAC controller energy consumed in each cell of the building.

9. One or more non-transitory machine-readable information storage mediums comprising one or more instructions which when executed by one or more hardware processors perform actions comprising:

dynamically receiving (302), using a thermodynamics model, a plurality of thermal signals using a plurality of sensors positioned in the building, wherein the building comprises an open plan space segmented into equally spaced cells comprising a plurality of infected cells and a plurality of uninfected cells;

determining (304), using an optimal occupancy placement technique, maximum allowable occupants in the plurality of uninfected cells based on (i) a plurality of parameters comprising an infection probability, an exposure, and a total number of segmented cells of the open plan space, (ii) a temperature and a humidity obtained from the plurality of thermal signals (iii) an estimated amount of viral particles concentration shed by a plurality of infected subjects at one or more of equally spaced cells in the open plan space of the building, and (iv) a susceptible probability of an uninfected subject infected at predefined exposure time, and (v) a one or more neighboring cells adjoining the infected cells; and estimating (306), using a joint actuator control technique, energy consumed by an HVAC (heating, ventilation and air conditioning) controller for the building based on the determined maximum allowable occupants, wherein the HVAC controller comprises a plurality of actuators in the open plan space of the building based on (i) the HVAC controller energy computed using a chiller energy and an actuator supply fan energy, (ii) a predefined temperature range, (iii) a cooling load of each actuator computed using a mass flow rate of the corresponding actuators, an enthalpy of actuator supply, and return air, and (iv) maximum average cell temperature range.

10. The one or more non-transitory machine-readable information storage mediums of claim 9, wherein determining maximum allowable occupants to be placed in the uninfected cells in the open plan space of the building using the optimal occupancy placement technique comprises:

obtain, the plurality of parameters comprising an infection probability, an exposure, and a total number of segmented cells of the open plan space;

compute, a thermal capacitance of air to determine the plurality of thermal parameters based on (i) an internal heat gain from the occupants, (ii) a convective heat gain from walls and windows of the building, (iii) an air mixing flowrate of temperature between adjoining cells, (iv) an infiltration rate of outside temperature and heat capacity, and (v) an actuator heat removal rate;

compute, air density volume of the open plan space based on (i) a moisture generation rate, (ii) an air mixing flowrate of humidity between adjoining cells, (iii) an infiltration rate of outside humidity, and (iv) an actuator moisture removal rate;

estimate, the amount of viral particles concentration based on (i) a viral shredding rate, (ii) a particle mixing from adjoining cells, (iii) an infiltration rate of outside air, and (iv) an actuator virus removal rate;

estimate, a susceptible probability of an uninfected subject infected at the predefined exposure time based on exponential function of breathing rate of an occupant and the viral particles concentration; and iteratively performing, to determine the maximum allowable occupants to be placed in the segmented cell of the open plan space of the building by, (d) placing, a first occupant at the cell that affects minimum neighboring cells and eliminate the neighboring cells affected by the first occupant;

(e) computing, an average euclidian distance between every consecutive cells in the open plan space and the cells occupied with the plurality of uninfected occupants; and (f) placing, a consecutive occupant at the cell which has minimum euclidian distance.

11. The one or more non-transitory machine-readable information storage mediums of claim 9, wherein minimizing energy consumed by an HVAC controller in the open plan space of the building for maximizing occupancy placement using the joint actuator control technique comprises:

computing, the HVAC controller optimized energy based on a actuator controller set points, the chiller energy and the actuator supply fan energy for every segmented cell;

determining, the temperature of averaged cells for all the segmented cells in the open plan space of the building;

determine, if the temperature of the segmented cells in the open plan space of the building is within the predefined temperature range;

compute, the maximum average temperature range for each cell in the open plan space;

sort, the available uninfected cells in the open plan space to determine the occupant counts;

iteratively, determine the required occupants to be placed in the viral concentration uninfected cells in the open space of the building by, i. placing, the first occupant at the cell which has minimum temperature and eliminate the neighboring cells viral concentration infected by the first occupant;

ii. sorting, the remaining available cells based on the temperature range to place the consecutive next occupant at the cell which has minimum temperature; and iii. recomputing, the HVAC controller for optimized energy based on the actuator controller set points.

12. The one or more non-transitory machine-readable information storage mediums of claim 9, wherein the maximum occupancy placement is improved based on the minimized HVAC controller energy consumed in each cell of the building.

* * * * *